United States Patent
Agarwal et al.

(10) Patent No.: US 10,895,459 B2
(45) Date of Patent: Jan. 19, 2021

(54) VEHICLE NAVIGATION SYSTEM AND METHOD

(71) Applicant: Aptiv Technologies Limited, St. Michael (BB)

(72) Inventors: Divya Agarwal, Sunnyvale, CA (US); Keerthi Raj Nagaraja, Thousand Oaks, CA (US); Michael H. Laur, Mission Viejo, CA (US); Brian R. Hilnbrand, Mountain View, CA (US)

(73) Assignee: Aptiv Technologies Limited, St. Michael (BB)

( * ) Notice: Subject to any disclaimer, the term of this patent is extended or adjusted under 35 U.S.C. 154(b) by 155 days.

(21) Appl. No.: 15/858,049

(22) Filed: Dec. 29, 2017

(65) Prior Publication Data

US 2019/0178650 A1 Jun. 13, 2019

Related U.S. Application Data

(60) Provisional application No. 62/598,218, filed on Dec. 13, 2017.

(51) Int. Cl.
 *G01C 21/26* (2006.01)
 *H04N 5/272* (2006.01)
 (Continued)

(52) U.S. Cl.
 CPC ......... *G01C 21/26* (2013.01); *G01C 21/3602* (2013.01); *G01S 5/0063* (2013.01);
 (Continued)

(58) Field of Classification Search
 CPC .. G01C 21/26; G01C 21/3602; G08G 1/0175; G08G 1/096783; G08G 1/04;
 (Continued)

(56) References Cited

U.S. PATENT DOCUMENTS 5,101,444 A * 3/1992 Wilson ............... G06K 9/32
 382/174
8,478,068 B2 * 7/2013 Miyashita ......... G06K 9/00664
 348/222.1

(Continued)

FOREIGN PATENT DOCUMENTS

| DE | 102015218964 | 3/2017 |
|----|--------------|--------|
| JP | 2006215911 | 8/2006 |
| JP | 2008033439 | 2/2008 |

OTHER PUBLICATIONS

"Extended European Search Report", EP Application No. 18209944.0, dated Jul. 30, 2019, 14 pages.
(Continued)

*Primary Examiner* — Russell Frejd
(74) *Attorney, Agent, or Firm* — Colby Nipper PLLC

(57) ABSTRACT

A vehicle navigation system includes a camera and a controller. The camera is configured to render an image of a host-vehicle in a field-of-view of the camera. The camera located remote from the host-vehicle. The controller is installed on the host-vehicle. The controller is configured to receive the image and determine a vehicle-coordinate of the host-vehicle in accordance with a position of the host-vehicle in the image. The camera may be configured to superimpose gridlines on the image, and the controller may be configured to determine the position in accordance with the gridlines.

20 Claims, 3 Drawing Sheets

(51) Int. Cl.
*G01S 5/16* (2006.01)
*G06T 7/70* (2017.01)
*G08G 1/017* (2006.01)
*G01C 21/36* (2006.01)
*G01S 5/00* (2006.01)
*G08G 1/04* (2006.01)
*G08G 1/01* (2006.01)
*G08G 1/0967* (2006.01)

(52) U.S. Cl.
CPC .......... *G01S 5/16* (2013.01); *G06T 7/70* (2017.01); *G08G 1/0116* (2013.01); *G08G 1/0175* (2013.01); *G08G 1/04* (2013.01); *G08G 1/096783* (2013.01); *H04N 5/272* (2013.01)

(58) Field of Classification Search
CPC ........ G08G 1/0116; H04N 5/272; G01S 5/16; G01S 5/0063; G06T 7/70
See application file for complete search history.

(56) References Cited

U.S. PATENT DOCUMENTS

| | | | | |
|---|---|---|---|---|
| 9,317,774 | B2* | 4/2016 | Villien | G05D 1/0234 |
| 9,637,050 | B2* | 5/2017 | Miura | B60Q 9/008 |
| 10,157,544 | B2* | 12/2018 | Altinger | G08G 1/04 |
| 10,281,925 | B2* | 5/2019 | Sakr | G05D 1/0276 |
| 2009/0237269 | A1* | 9/2009 | Okugi | B60R 1/00 |
| | | | | 340/901 |
| 2010/0290673 | A1* | 11/2010 | Miyashita | G06K 9/00664 |
| | | | | 382/103 |
| 2011/0305392 | A1* | 12/2011 | Kapoor | G06K 9/4642 |
| | | | | 382/174 |
| 2012/0158282 | A1 | 6/2012 | Park | |
| 2013/0028518 | A1* | 1/2013 | Ozawa | G06K 9/00456 |
| | | | | 382/173 |
| 2014/0067140 | A1* | 3/2014 | Gow | G06Q 50/06 |
| | | | | 700/291 |
| 2014/0074341 | A1* | 3/2014 | Weiss | B66F 9/063 |
| | | | | 701/25 |
| 2014/0211998 | A1* | 7/2014 | Villien | G05D 1/0234 |
| | | | | 382/103 |
| 2014/0320658 | A1* | 10/2014 | Pliefke | B60R 1/002 |
| | | | | 348/148 |
| 2015/0185003 | A1* | 7/2015 | Suh | G01C 3/02 |
| | | | | 701/300 |
| 2016/0150070 | A1* | 5/2016 | Goren | H04W 48/04 |
| | | | | 455/404.2 |
| 2016/0232412 | A1* | 8/2016 | Nishijima | G06K 9/00791 |
| 2016/0277601 | A1* | 9/2016 | Seymour | H04N 7/181 |
| 2016/0280134 | A1* | 9/2016 | Miura | B60Q 9/008 |
| 2017/0252925 | A1* | 9/2017 | Cho | B25J 9/1666 |
| 2018/0065541 | A1 | 3/2018 | Augusty | B60Q 1/26 |
| 2018/0113472 | A1* | 4/2018 | Sakr | G05D 1/0276 |
| 2018/0371723 | A1* | 12/2018 | Nishi | G05D 1/101 |

OTHER PUBLICATIONS

"Partial European Search Report", EP Application No. 18209944.0, dated Apr. 29, 2019, 14 pages.

* cited by examiner

VEHICLE NAVIGATION SYSTEM AND METHOD

TECHNICAL FIELD OF INVENTION

This disclosure generally relates to a vehicle navigation system, and more particularly relates to a controller that determines a vehicle-coordinate of a host-vehicle in which the controller is installed, where the vehicle-coordinate is determined in accordance with a position of the host-vehicle in an image rendered by a camera located remote from the host-vehicle.

BRIEF DESCRIPTION OF DRAWINGS

The present invention will now be described, by way of example with reference to the accompanying drawings, in which.

DETAILED DESCRIPTION

Figure 1:
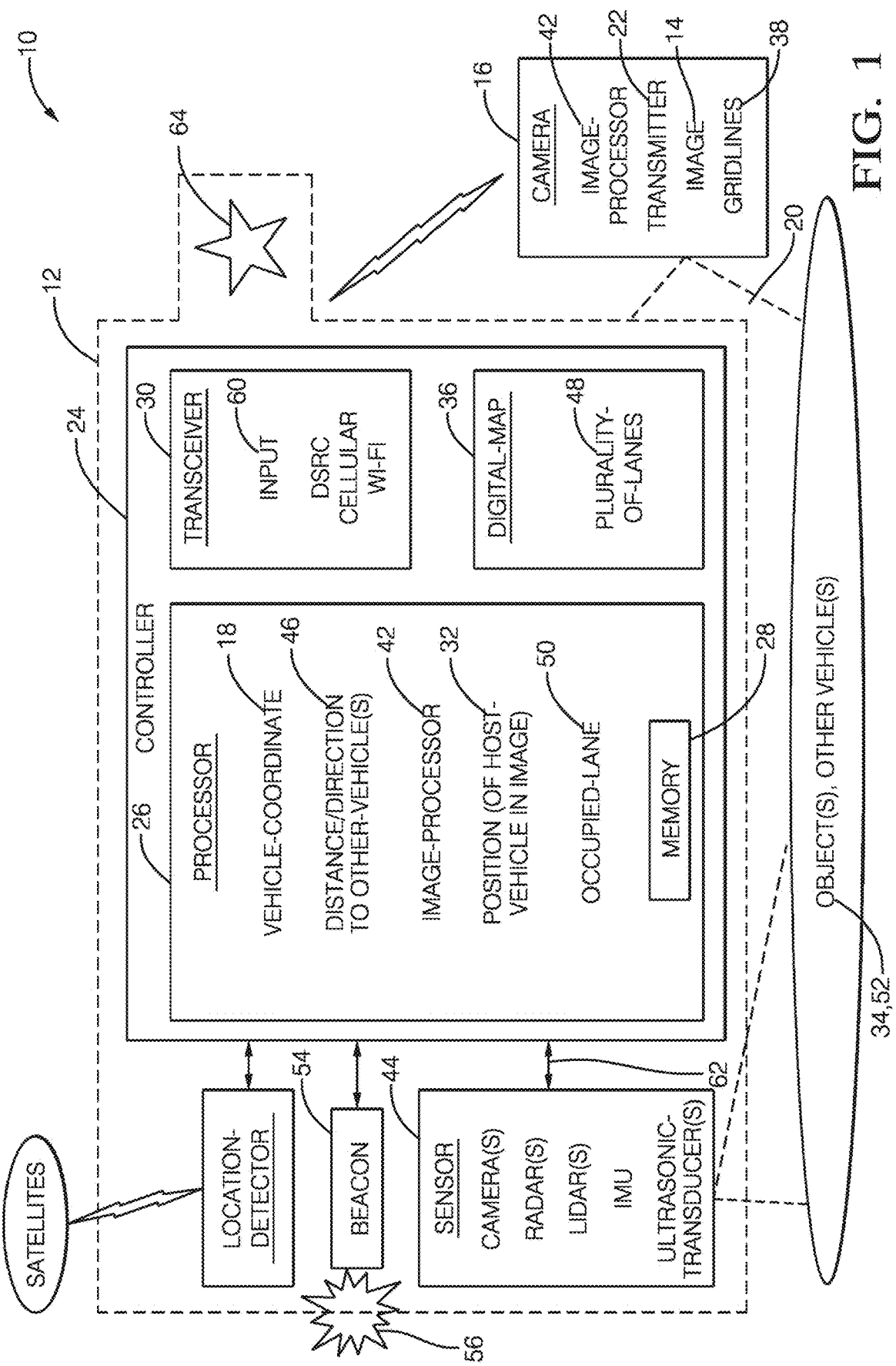
FIG. 1 is a diagram of a vehicle navigation system in accordance with one embodiment.

FIG. 1 illustrates a non-limiting example of a vehicle navigation system 10, hereafter referred to as the system 10, which makes use of an image 14 from (i.e. rendered or captured or recorded by) a remote camera 16 (e.g. traffic-camera), and is hereafter referred to as the camera 10. As will be explained in more detail below, the image 14 is used by the system 10 to determine a vehicle-coordinate 18 (e.g. latitude, longitude, elevation) of a host-vehicle 12. The host-vehicle 12 may be characterized as an automated vehicle. As used herein, the term automated vehicle may apply to instances when the host-vehicle 12 is being operated in an automated-mode, i.e. a fully autonomous or driverless mode, where a human-operator (not shown) of the host-vehicle 12 may do little more than designate a destination to operate the host-vehicle 12. However, full automation is not a requirement. It is contemplated that the teachings presented herein are useful when the host-vehicle 12 is operated in a manual-mode where the degree or level of automation may be little more than providing an audible or visual warning to the human-operator who is generally in control of the steering, accelerator, and brakes of the host-vehicle 12. For example, the system 10 may merely assist the human-operator as needed to change lanes and/or avoid interference with and/or a collision with, for example, an object such as another-vehicle, a pedestrian, or a road sign.

The camera 16 is configured to render (i.e. capture and/or transmit) the image of a host-vehicle 12 while the host-vehicle 12 is present in a field-of-view 20 of the camera 16. The image may be a continuous feed with timestamps or individual images at a suitable frame rate, five frames per second (5 fps) for example. The images may be continuously transmitted or only transmitted when requested by the host-vehicle 12. As suggested above, the camera 16 is located remote from, i.e. not installed on or physically attached to, the host-vehicle 12. Those in the art will recognize that suitable examples of the camera 16 are commercially available. The camera 16 may include a transmitter 22 used to wirelessly transmit or broadcast the image 14 to the host-vehicle 12. The transmission may be by way of radio-frequency (RF) communications such as dedicated-short-range-communications (DSRC), cellular network communications (LTE), Wi-Fi, or other radio based communications means. The transmission may be direct or via a cloud connection with appropriate latency and time-stamps. Alternatively, the transmitter 22 may transmit the image 14 using infrared light (IR) so the range of transmission is relatively limited and does not further crowd the RF spectrum. While transmitter 22 is shown as being part of the camera 16, this is not a requirement. It is contemplated that the camera 16 could be wire or wirelessly connected to a wide area traffic-control-system (not shown) that coordinates the broadcasting or transmission of the image 14.

Figure 2:
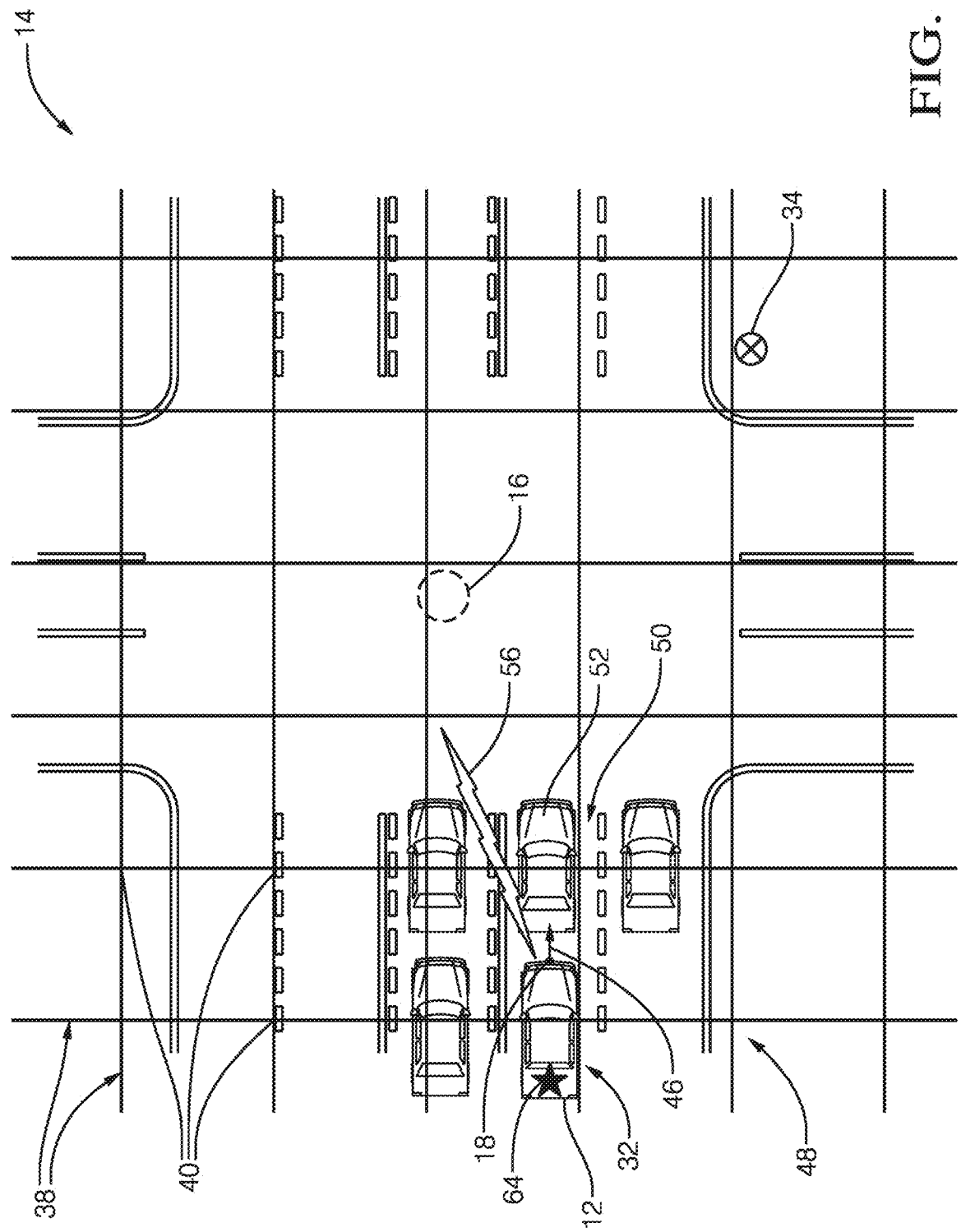
FIG. 2 is an image generated by the system of FIG. 1 in accordance with one embodiment.

FIG. 2 illustrates a non-limiting example of an instance of the image 14 rendered and optionally transmitted by the camera 16. It should be understood that the camera 16 is not actually in the image 14, but is illustrated as an example of where the camera 16 could be located relative to the host-vehicle 12. The image 14 is such that it suggests that there has been some processing of the raw-image seen through the lens of the camera 16 as there are no apparent perspective effects in the image as would be expected if the camera were positioned at a relatively low elevation, e.g. less than twenty meters above the surface of the intersection depicted in the image 14. Those in the image processing arts will recognize that image processing algorithms are readily available that would remove perspective effects to provide this instance of the image 14. It is also recognized that the camera 16 could be located off-center of the image 14, e.g. over a corner of the intersection, and image processing could be used to provide an image with the apparent perspective illustrated. In addition to the visual information in the image 14, metadata such as a time-stamp and/or coordinates and viewing-direction of camera 16 may be included in the data-stream that conveys the image 14.

Returning to FIG. 1, the system 10 includes a controller 24 installed on the host-vehicle 12. The controller 24 may include a processor 26 such as a microprocessor or other control circuitry such as analog and/or digital control circuitry including an application specific integrated circuit (ASIC) for processing data as should be evident to those in the art. Hereafter, a reference to the controller 24 being configured for something is to be interpreted as suggesting that alternatively the processor 26 may also be configured for the same thing.

The controller 24 may include memory 28, i.e. non-transitory computer-readable storage medium 28, including non-volatile memory, such as electrically erasable programmable read-only memory (EEPROM) for storing one or more routines, thresholds, and captured data. The memory 28 may be part of the processor 26, or part of the controller 24, or separate from the controller 24 such as remote memory stored in the cloud. The one or more routines may be executed by the controller 24 or the processor 26 to perform steps for determining the vehicle-coordinate 18 of the host-vehicle 12 based on signals received by the controller 24 from the camera 16 as described herein.

The controller 24 may include a transceiver 30 equipped with an input 60 configured to receive the image 14 by, for example, wireless communication via IR, DSRC, LTE, or Wi-Fi. As will be explained in more detail below, the controller 24 (or the processor 26) is configured to determine the vehicle-coordinate 18 (e.g. latitude, longitude, elevation) of the host-vehicle 12 in accordance with (i.e. based on) a position 32 of the host-vehicle in the image 14. The position 32 may be expressed as, for example but not limited to, an x-y location in image with respect to a perimeter-frame (not shown) of the image 14 or with respect to some referencemark or reference-object in the image 14, a reference-post 34 (FIG. 2) for example, or relative to the camera 16. A camera-coordinate (e.g. latitude, longitude, elevation) of the camera 16 may be determined by accessing a digital map 36, reading a QR code proximate to the camera 16, or the camera-coordinate may be communicated as data along with image 14. It is also contemplated that the necessary rotation and translation can be done to recover the location (the vehicle-coordinate 18) on vehicle coordinate frame.

Referring now to FIG. 2, the image 14 may include gridlines 38 in the image 14 to help with the determination of the vehicle-coordinate 18. In one non-limiting embodiment of the system 10, the camera 16 is configured to superimpose the gridlines 38 on the image 14. In this instance, the gridlines 38 are shown as equally spaced because of the aforementioned image-processing that removes perspective effects from the image. Alternatively, the gridlines 38 may be added to an unprocessed perspective-view where the gridlines 38 are spaced according to the perspective. The un-equally spaced gridlines may then be used either to assist with processing of the image to remove the perspective effect, or to determine the relative position (i.e. the position 32) of the host-vehicle 12 with respect to the camera 16. That is, the gridlines 38 may not be equally spaced when the image 14 show some perspective other than the overhead view shown in FIG. 2 so that the gridlines are equally spaced if/when the perspective view is transposed to an overhead-view.

The controller 24 is configured to determine the position 32 in accordance with the gridlines 38. It follows that the controller 24 is configured to determine the vehicle-coordinate 18 with respect to the gridlines 38, i.e. in accordance with or based on the position 32. The determination of the vehicle-coordinate 18 may be based on interpolation with respect to the gridlines 38. The relative position or distance along an instance of gridlines 38 may be expressed or determined based on a complex function supplied from the camera as metadata as part of in the image 14. Validation of the distance along a gridline can be accomplished by choosing a known object-size or object-position from a digital-map OR determining an object-size or object-position of an object with a sensor 44 (e.g. camera, radar, lidar, inertial-measurement-unit (IMU), ultrasonic-transducer, or any combination thereof) of the host-vehicle 12 and comparing to a corresponding size or position in accordance with the gridlines. The points 40 where perpendicular instances of the gridlines 38 intersect may be identified with coordinates communicated with the image 14 or may be determined based on relative position to camera or reference-object.

Referring again to FIG. 1, the system 10 may include an image-processor 42 that may be in the controller 24 or part of the camera 16, or partially in the controller 24 and the camera 16. The image-processor 42 may be configured to determine the position 32 of the host-vehicle 12 in the image. In one embodiment that does not include using or providing the gridlines 38, a signal 62 from the sensor 44 may be used to determine a distance-and-direction to the camera 16 and/or the object 34, and then known geometric analysis may be performed to determine which of multiple vehicles in the image 14 is the host-vehicle 12. Then, with coordinates of the camera 16 and/or the reference-post 34, which may be included in the image 14 or recalled from the digital-map 36, the vehicle-coordinate 18 can be determined. If the image 14 includes the gridlines 38, then an image-distance and image-direction from the host-vehicle 12 to one or more instances of the points 40 can be measured from the image 14, and the vehicle-coordinate 18 can be determined based on the relative position of the points 40. Alternatively, the determination of which is the host-vehicle 12 may be based on the relative-position of an object 34 (e.g. the reference-post 34) in the image 14, or based on a comparison of size, color, motion and/or a distance-and-direction 46 of other-vehicles in image 14 and/or detected by sensor 44 of host-vehicle 12.

Another way to determine, or at least reduce the number of possibilities, which of a plurality of other-vehicles is the host-vehicle 12 is to determine which lane of a roadway the host-vehicle 12 resides. In an embodiment of the system 10, the image-processor 42 is installed in the host-vehicle 12, the system includes the digital-map 36, and the controller 24 is configured to determine which of a plurality of lanes 48 is an occupied-lane 50 where the host-vehicle 12 resides. It is contemplated that the sensor 44 such as a camera, and/or or low-accuracy global-position-sensor (GPS) or GPS+IMU combination can determine which lane is occupied by host-vehicle 12. It is also contemplated that the camera in combination with the image-processor 42 can determine a lane-marking-type (e.g. dashed or solid) and/or a lane-marking-color (e.g. yellow or white) and/or presence of a curb/barrier which can help identify the occupied-lane 50 occupied by the host-vehicle 12 in the image 14.

Another way to determine, or at least reduce the number of possibilities, which of a plurality of other-vehicles is the host-vehicle 12 is to determine a distance and a direction (i.e. the distance-and-direction 46) to an other-vehicle 52 indicated in the image 14. This may include the controller 24 creating a local map of the other-vehicles based on, but not limited to, the color of the other-vehicles and/or their estimated positions, and compare this self-made map to the image 14, after any necessary transformations, i.e. rotations and/or translations.

In yet another embodiment, the system 10 may include a beacon 54 (FIG. 1) installed on the host-vehicle 12. The beacon 54 is configured to emit a light-signal 56 that is preferably an infrared (IR) light so that humans near the host-vehicle 12 are not distracted by the light-signal 56. The image-processor 42, which as previously mentioned can be in the host-vehicle 12 and/or the camera 16, is configured to determine the position 32 of the host-vehicle 12 in the image 14 in accordance with a detection of the light-signal 56. The light-signal may be encoded so multiple instances of beacons can be distinguished, or the beacon 54 may be turned on and off as necessary until the image-processor can distinguish the light-signal 56 from any other light sources in the image 14 so that the position of beacon 54 or the light-signal 56 in image 14 indicates position 32 of host-vehicle 12 in the image 14.

In yet another embodiment, the system 10 may include an attribute 64 (FIGS. 1 and 2) installed on the host-vehicle 12. The attribute 64 is loaded into the controller 24 at time of manufacturing or entered by the vehicle owner. The image-processor 42, which as previously mentioned can be in the host-vehicle 12 and/or the camera 16, is configured to determine the position 32 of the host-vehicle 12 in the image 14 in accordance with a detection of the attribute 64. Suitable examples of the attribute 64 include, but are not limited to, a number or symbol on the roof or body of the host-vehicle 12, a vehicle-profile appropriate for the image processor to match, and/or vehicle-color.

Figure 3:
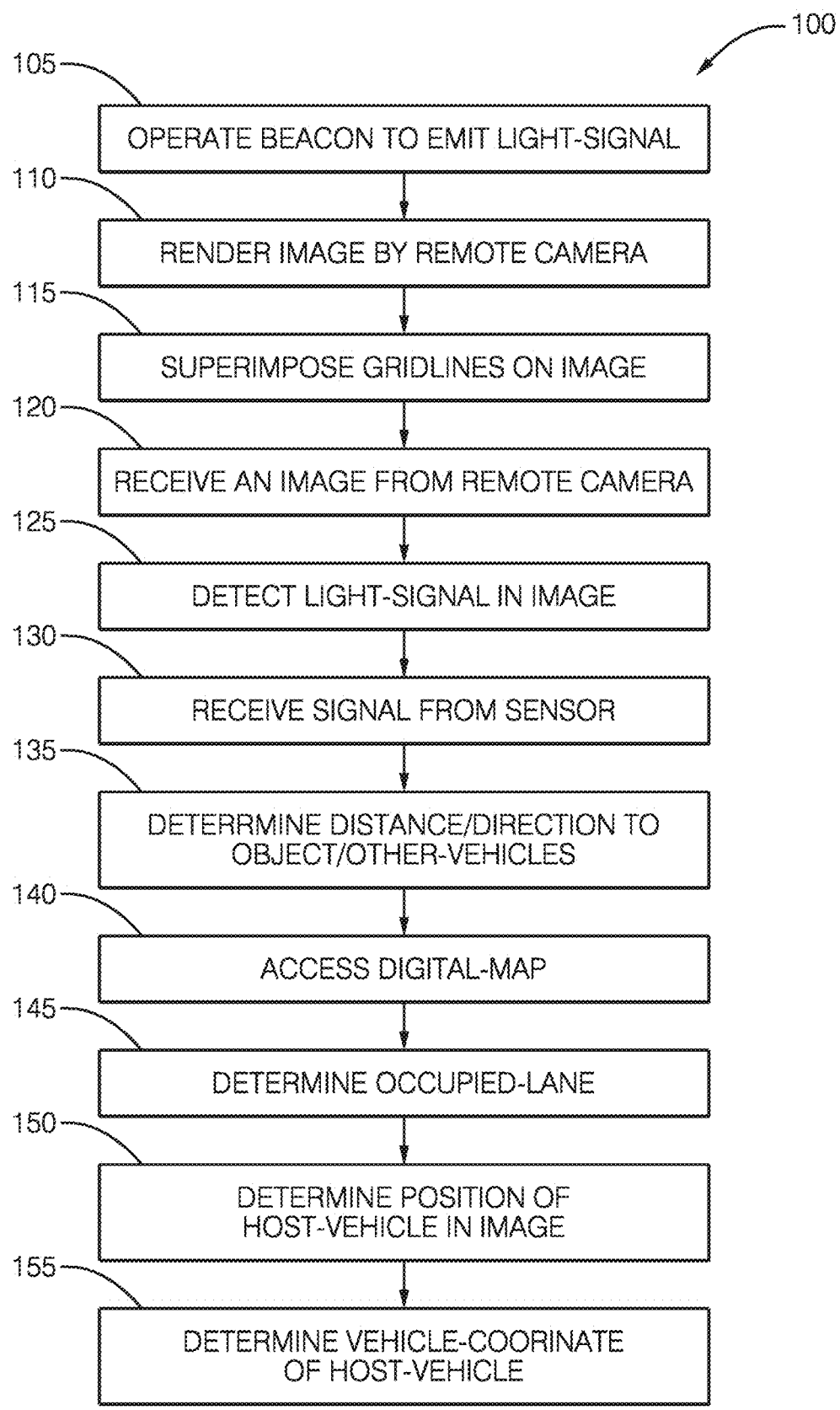
FIG. 3 is flowchart of a method of operating the system of FIG. 1 in accordance with one embodiment.

FIG. 3 illustrates a non-limiting example of a method 100 of operating the system 10. The method 100 may also suggest a way to operate or program the controller 24 or the processor 26.

Step 105, OPERATE BEACON TO EMIT LIGHT-SIGNAL, may include operating one or more instances of the beacon 54 installed on the host-vehicle 12 to emit the light-signal 56. Operating may include turning the beacon 54 on and off in response to a request from the image-processor 42 so the image-processor 42 can distinguish the beacon 54 from other beacons installed on other-vehicles. Alternatively, the light-signal may be modulated to indicate, for example, a vehicle identification number (VIN) unique to the host-vehicle 12.

Step 110, RENDER IMAGE BY REMOTE CAMERA, may include operating the camera 16 to capture or record one or more images of objects present in the field-of-view 20. The image 14 may be a from a single instant in time which may include a time-stamp. Alternatively, the image 14 may be a burst or sequence of still images, or a video image continuously broadcast or output by the camera 16.

Step 115, SUPERIMPOSE GRIDLINES ON IMAGE, may include superimposing, by the camera or the controller 24, the gridlines 38 on the image. The gridlines may be equally spaced, especially if the image is a perspective corrected images such as that shown in FIG. 1. Alternatively, the gridlines may be closer together near, e.g. closer than five meters (5m), to the host-vehicle 12 and further apart in the areas of the field-of-view 20 that are further away from the host-vehicle 12. If the image 14 from the camera 16 is not perspective corrected, the gridlines 38 may be spaced apart so that when subsequent image-processing is performed, the perspective corrected version of the image 14 has equally spaced gridlines as shown in FIG. 2.

Step 120, RECEIVE AN IMAGE FROM REMOTE CAMERA, may include receiving, by the controller 24 or more specifically the transceiver 30, the image 14 from (e.g. broadcasted or transmitted by) the camera 16. The camera 16 is necessarily located remote from the host-vehicle 12, i.e. not mounted on or otherwise physically attached to the host-vehicle 12. The camera 16 is aimed or oriented so that the image 14 depicts the host-vehicle 12. That is, the host-vehicle 12 is in the field-of-view 20 of the camera 16.

Step 125, DETECT LIGHT-SIGNAL IN IMAGE, may include the controller 24, or more specifically the image-processor 42, detecting the light-signal 56 in the image 14.

Step 130, RECEIVE SIGNAL FROM SENSOR, may include receiving the signal 62 from the sensor 44 that is installed on the host-vehicle 12 if the system 10 is so equipped. The signal 62 may include or consist of another image from the camera in the sensor, a radar-return signal, a lidar cloud-point, or other indication of objects proximate to the host-vehicle 12 that are detected by the sensor 44.

Step 135, DETERMINE DISTANCE/DIRECTION TO OBJECT/OTHER-VEHICLE, may include the controller 24 or the processor 26 processing the signal 62 from the sensor 44 to determine a distance and a direction (the distance-and-direction 46) to an other-vehicle 52 detected by the sensor 44.

Step 140, ACCESS A DIGITAL-MAP, may include the controller 24 or the processor 26 accessing a digital-map 36 of the field-of-view 20 to, for example, recall or retrieve GPS coordinates of the camera 16 and/or the reference-post 34, or other map features. The digital-map may also include or provide GPS coordinates of the gridlines 38 and/or the points 40.

Step 145, DETERMINE OCCUPIED-LANE, may include the controller 24 or the processor 26 determining from the digital-map 36 and the image 14 which of a plurality of lanes 48 is an occupied-lane 50 which is defined as the lane occupied by the host-vehicle 12.

Step 150, DETERMINE POSITION OF HOST-VEHICLE IN IMAGE, may include determining the position 32 in accordance with (i.e. based on) the gridlines 38 by interpolating between the GPS coordinates of the gridlines 38 and/or the points 40. Step 150 may additionally or alternatively include determining the position 32 of the host-vehicle 12 in accordance with (i.e. based on) a detection of the light-signal 56 in the image 14.

Step 155, DETERMINE VEHICLE-COORDINATE OF HOST-VEHICLE, may include determining the vehicle-coordinate 18 (e.g. GPS coordinates of latitude, longitude, and elevation) of the host-vehicle 12 in accordance with a position 32 of the host-vehicle 12 in the image 14.

Referring again to FIG. 1, the system 10 includes a first device 24 that includes one or more instances of the processor 26, a memory 28, and one or more instances of a program stored in the memory 28. The one or more programs include instructions (105, 110, 115, . . . 155) for performing the method 100. The system 10 also includes or consists of a non-transitory computer-readable storage medium 28 comprising one or more programs 100 for execution by one or more processors 26 of a first device 24, the one or more programs including instructions which, when executed by the one or more processors 26, cause the first device 24 to perform the method 100.

Accordingly, a vehicle navigation system 10 (the system 10), a controller 24 for the system 10, and a method 100 of operating the system 10 are provided. In dense urban environments, e.g. urban canyons, the absolute positioning provided by GPS may not very accurate due to lack of tracked satellites, change of tracked satellites, multipath, blocked correction factors due to line-of-sight issues, overhead trees, bad cellular coverage, non-correspondence of received & correction factor satellites, etc. Described herein is a system and a method of providing a precise globally referenced localization (position & pose). The system and method are particularly useful for dealing with IMU drift during positioning between two locations that are close enough to use an IMU before drift makes the IMU determined positioning unusable.

While this invention has been described in terms of the preferred embodiments thereof, it is not intended to be so limited, but rather only to the extent set forth in the claims that follow.

We claim:

1. A vehicle navigation system, said system comprising:
a camera configured to render an image of a host-vehicle on a roadway in a field-of-view of the camera, said camera comprising a traffic-camera located remote from the host-vehicle and connected to a wide area traffic-control-system that coordinates transmission of the image; and
a controller installed on the host-vehicle, said controller configured to receive the image and determine a vehicle-coordinate of the host-vehicle in accordance with a position of the host-vehicle on the roadway in the image.

2. The system in accordance with claim 1, wherein the camera is configured to superimpose gridlines on the image, and the controller is configured to determine the position in accordance with the gridlines.

3. The system in accordance with claim 1, wherein the system includes an image-processor configured to determine the position of the host-vehicle in the image.

4. The system in accordance with claim 3, wherein the image-processor is installed in the host-vehicle, the system includes a digital-map, and the controller is configured to determine which of a plurality of lanes is an occupied-lane where the host-vehicle resides.

5. The system in accordance with claim 3, wherein the system includes a sensor installed on the host-vehicle, said sensor configured to determine a distance-and-direction to an object indicated in the image.

6. The system in accordance with claim 3, wherein the camera is configured to superimpose gridlines on the image, and the controller is configured to determine the position in accordance with the gridlines.

7. The system in accordance with claim 1, wherein the system includes a beacon installed on the host-vehicle, said beacon configured to emit a light-signal, and the image-processor is configured to determine the position of the host-vehicle in the image in accordance with a detection of the light-signal.

8. The system in accordance with claim 7, wherein the light-signal comprises infrared light.

9. The system in accordance with claim 7, wherein the light-signal is modulated to indicate an identification number that is unique to the host-vehicle.

10. The system in accordance with claim 1, wherein the system includes an attribute installed on the host-vehicle, said attribute detectable in the image, and the image-processor is configured to determine the position of the host-vehicle in the image in accordance with a detection of the attribute.

11. A controller for a vehicle navigation system, said controller comprising:
an input configured to receive an image from a camera configured to render an image of a host-vehicle on a roadway in a field-of-view of the camera, said camera comprising a traffic-camera located remote from the host-vehicle and connected to a wide area traffic-control-system that coordinates transmission of the image; and
a processor configured to determine a vehicle-coordinate of the host-vehicle in accordance with a position of the host-vehicle on the roadway in the image.

12. The controller in accordance with claim 11, wherein the camera is configured to superimpose gridlines on the image, and the processor is configured to determine the position in accordance with the gridlines.

13. The controller in accordance with claim 11, wherein the processor includes an image-processor configured to determine the position of the host-vehicle in the image.

14. The controller in accordance with claim 13, wherein the processor is configured to communicate with a beacon installed on the host-vehicle, said beacon configured to emit a light-signal, and the image-processor is configured to determine the position of the host-vehicle in the image in accordance with a detection of the light-signal.

15. The controller in accordance with claim 11, wherein the image-processor is configured to determine the position of the host-vehicle in the image in accordance with a detection of an attribute on the host-vehicle.

16. A method of operating a vehicle navigation system, said method comprising:
receiving an image from a camera, wherein the image depicts a host-vehicle on a roadway in a field-of-view of the camera, said camera comprising a traffic-camera located remote from the host-vehicle and connected to a wide area traffic-control-system that coordinates transmission of the image;
receiving the image by a controller installed on the host-vehicle; and
determining a vehicle-coordinate of the host-vehicle in accordance with a position of the host-vehicle on the roadway in the image.

17. The method in accordance with claim 16, wherein the method includes:
superimposing, by the camera, gridlines on the image; and
determining the position in accordance with the gridlines.

18. The method in accordance with claim 16, wherein the method includes:
accessing a digital-map of the field-of-view; and
determining from the digital-map and the image which of a plurality of lanes is an occupied-lane occupied by the host-vehicle.

19. The method in accordance with claim 16, wherein the method includes:
receiving a signal from a sensor installed on the host-vehicle; and
determining a distance-and-direction to an object detected by the sensor.

20. The method in accordance with claim 16, wherein the method includes:
operating a beacon installed on the host-vehicle to emit a light-signal;
detecting the light-signal in the image; and
determining the position of the host-vehicle in accordance with a detection of the light-signal in the image.

* * * * *